July 9, 1968  J. G. AMBERS ET AL  3,391,463
APPARATUS FOR MEASURING THE THICKNESS OF AN ADVANCING STRIP
Filed April 12, 1966  4 Sheets-Sheet 1

INVENTORS
J.G. AMBERS
G. DORNBERGER
R.R. WAHLBERG
By A. J. Nugent
ATTORNEY

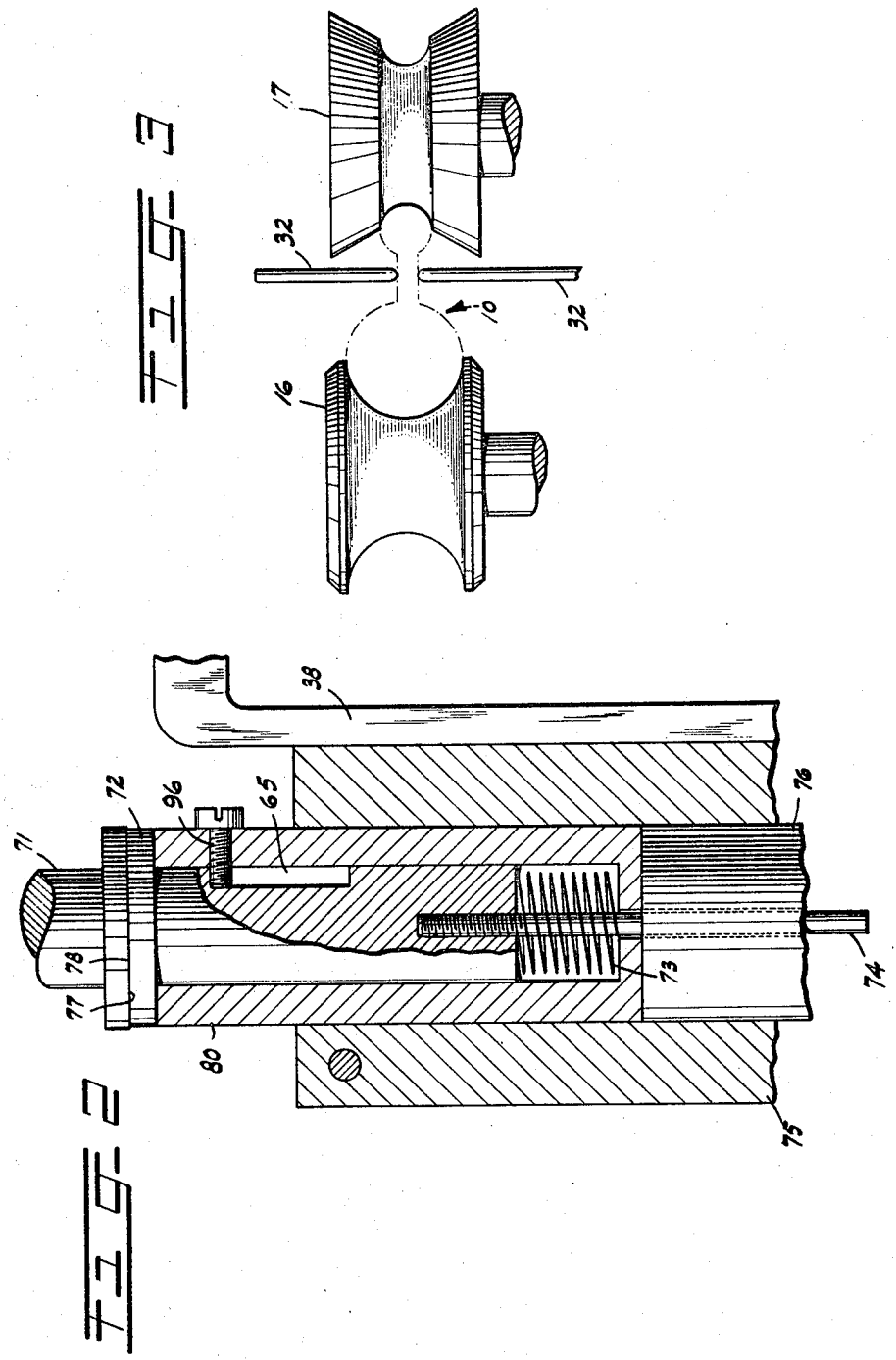

July 9, 1968  J. G. AMBERS ET AL  3,391,463
APPARATUS FOR MEASURING THE THICKNESS OF AN ADVANCING STRIP
Filed April 12, 1966  4 Sheets-Sheet 4

United States Patent Office 3,391,463
Patented July 9, 1968

3,391,463
APPARATUS FOR MEASURING THE THICKNESS OF AN ADVANCING STRIP
John G. Ambers, Kenilworth, Georg Dornberger, Murray Hill, and Roger R. Wahlberg, Bloomfield, N.J., assignors to Western Electric Company, Incorporated, New York, N.Y., a corporation of New York
Filed Apr. 12, 1966, Ser. No. 542,089
10 Claims. (Cl. 33—149)

ABSTRACT OF THE DISCLOSURE

An opposed contact gauge for measuring continuously the thickness of the connecting web of insulation of a self-supporting cable. The gauge has a pair of pivotally mounted levers each having rollers which engage opposite sides of the web and a transformer and tuning probe connected to one of the levers so as to measure changes in thickness of the web. In order that the gauge only respond to thickness changes and not to changes in cable position by providing a connect which allows lateral sliding movement between the tuning probe and the levers without disturbing the axial position of the probe with respect to the transformer.

---

Figure 1:
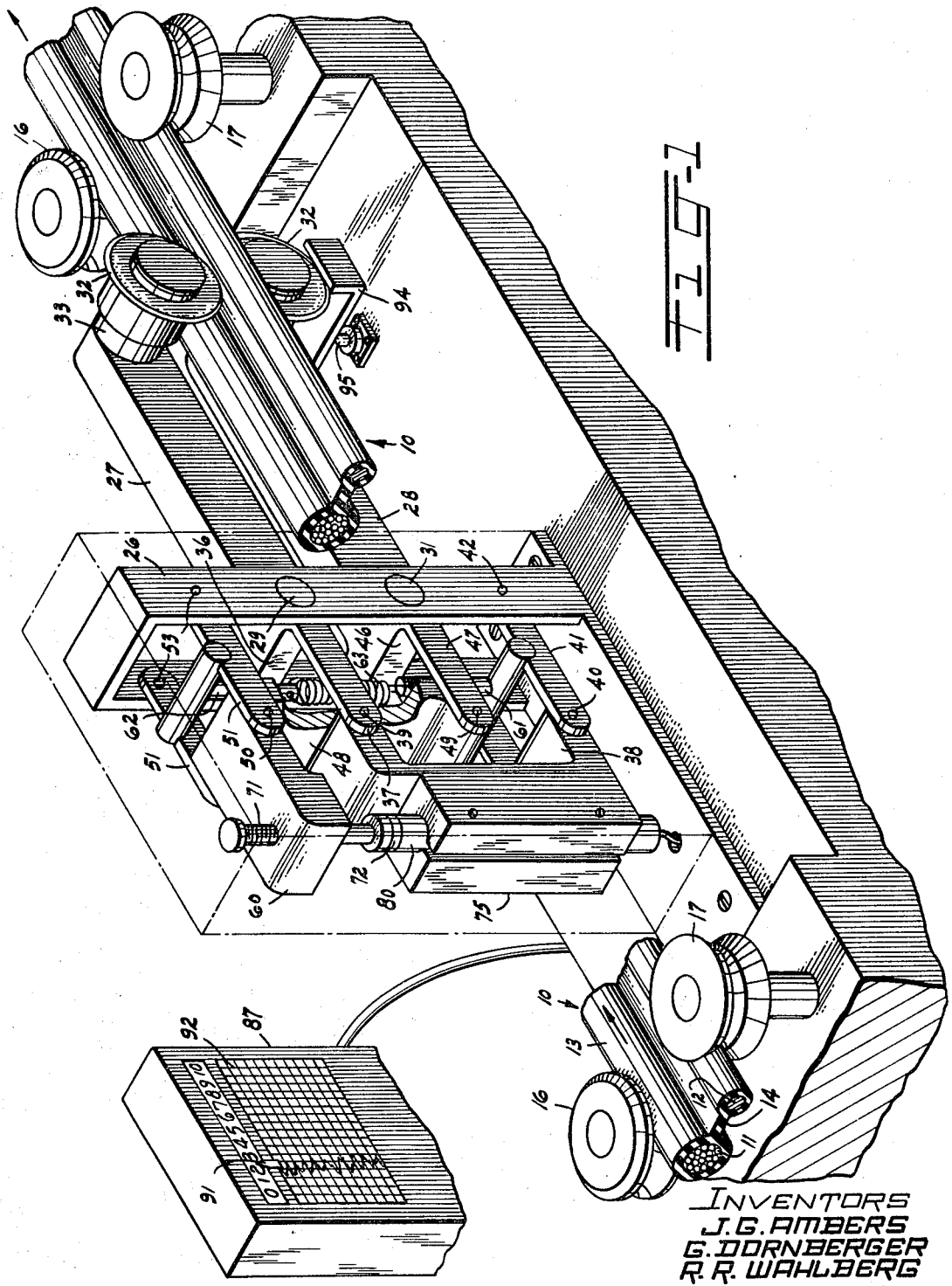

The invention relates to apparatus for measuring the thickness of a strip as it is being fed and more especially to apparatus for measuring the thickness of the connecting web of insulation of a self-supporting cable.

As shown in Patent 3,207,836, a self-supporting cable normally comprises a sheathed cable core including a plurality of insulated wires, a support wire extending substantially parallel to the core, and an integral extruded plastic sheath covering the core and support wire and interconnecting them by means of a reduced flat web portion. The cable core is usually undulated in order to provide excess length for the wires to facilitate making connections in the field.

It is essential that the thickness of the connecting web be maintained within prescribed limits to assure that the completed cable meets established mechanical and electrical requirements. On the one hand, for example, it is desirable that the web have a minimum thickness in order that it may be strong enough to support the cable core when the cable is stretched between poles or other structures in the field. On the other hand, the connecting web should not have such a thickness that an unwarranted increase in material cost results. Furthermore, the thickness may be determinative of the height of the web or, stated differently, the distance between the portion of the sheath surrounding the support wire and the portion of the sheath surrounding the cable core. It has been found that when the web becomes overly thick, the increased thickness may be caused by a crossover condition, that is, the support wire and cable core tend to twist in relation to each other following the extruding operation. This condition shortens the web height and makes it difficult to attach clamps to the cable in the field since the clamp is dimensioned in accordance with the desired web height.

An object of the invention is to facilitate the measurement of the thickness of a strip as it is being fed.

A more particular object of the invention is to measure accurately the thickness of the connecting web of a self-supporting cable.

Another object of the invention is to measure the thickness of a strip wherein accurate recordings are made and there are no false responses recorded upon movement of the strip out of its path.

In order to determine the thickness of the connecting web, it is proposed to continuously monitor the web thickness and record such thickness by means of an apparatus located on the cable line at a point following the extruder. In a preferred embodiment of the invention, a pair of lever systems are provided. Each system includes a pivotally mounted main lever carrying at one end a roller which engages the traveling web. The respective rollers face each other at opposite sides of the web. One of the main levers, at the end thereof opposite to the end carrying the roller, supports a transformer and a tuning probe by means of a linkage whereas the other main lever, at its end opposite to the end at which it carries the roller, supports an adjustable pin by means of a linkage.

The transformer forms the inductance portion of a tuned circuit which feeds signals representative of the web thickness to a recording device in dependence on the relative positions of the transformer and the probe. An important consideration in the operation of the lever systems is that the tuning probe remains accurately located with respect to the transformer coils during operation. It is also important in the operation of the lever systems to make certain that the apparatus responds only to thickness changes and not to changes in cable position. Contributing to the recording accuracy of the apparatus are two pairs of rollers, one pair at either side of the apparatus, for maintaining the web steadily in a horizontal position while its thickness is being gauged.

The adjustable pin, which is carried by one of the linkages, is provided with a flat end surface. The other linkage carries a spring pressed plunger to which the tuning probe is coupled. The plunger has a flat end surface which continuously engages the flat end surface of the pin. This arrangement allows lateral sliding movement between the pin and plunger without disturbing the axial position of the probe with respect to the transformer.

Figure 4:
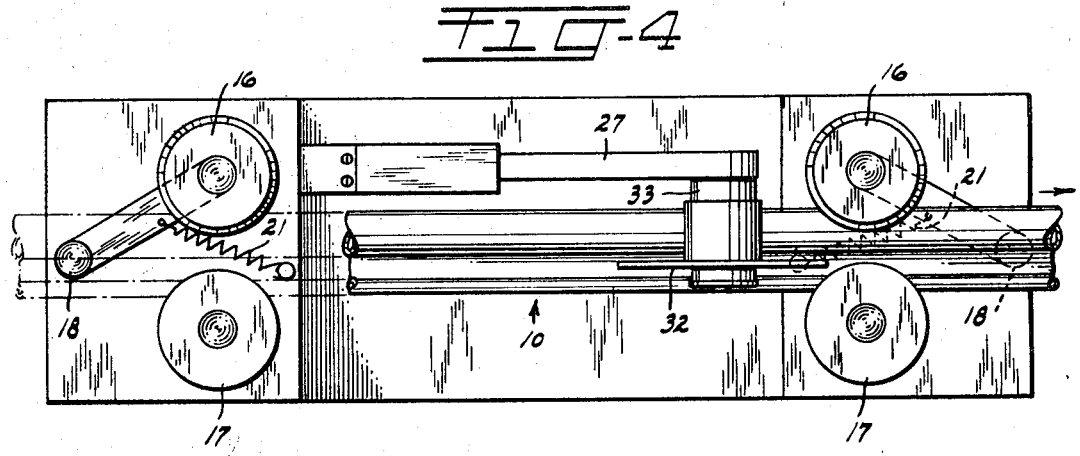
Figure 5:
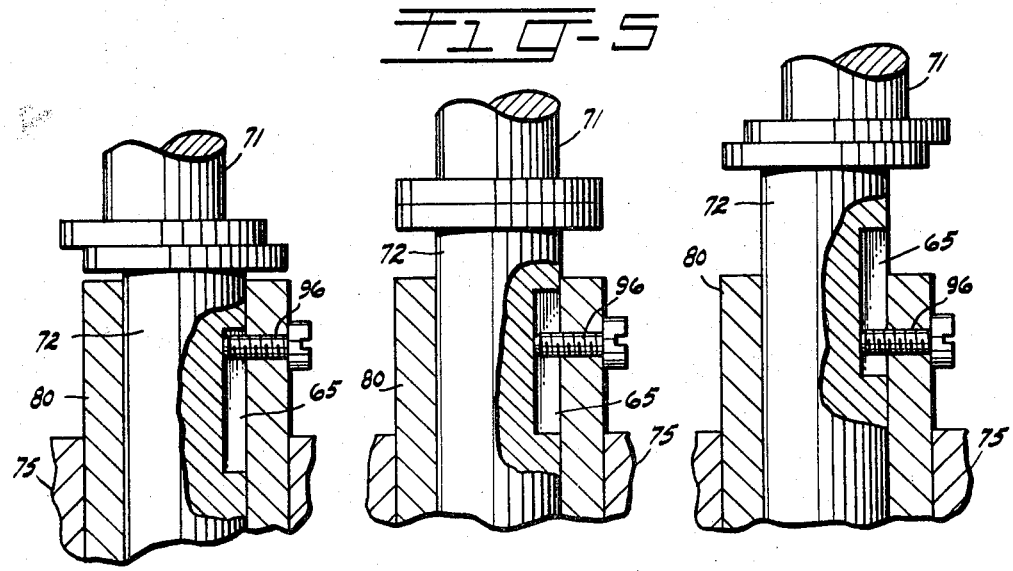
Figure 7:
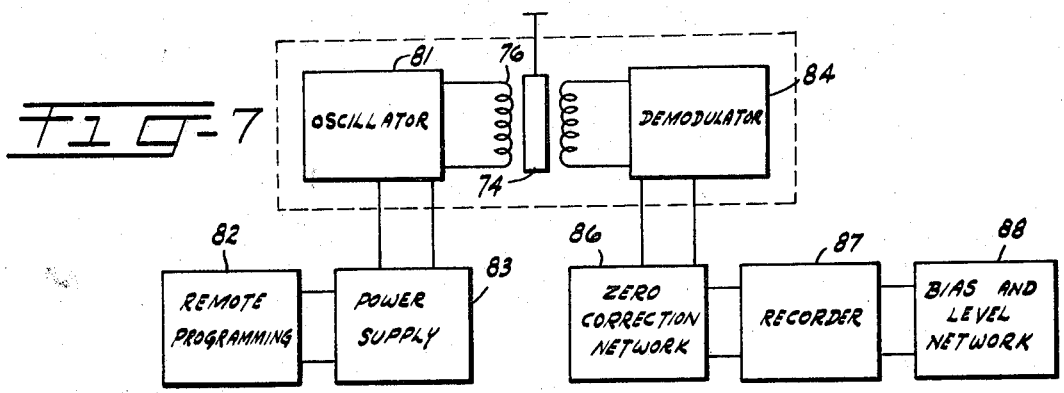
Figure 6:
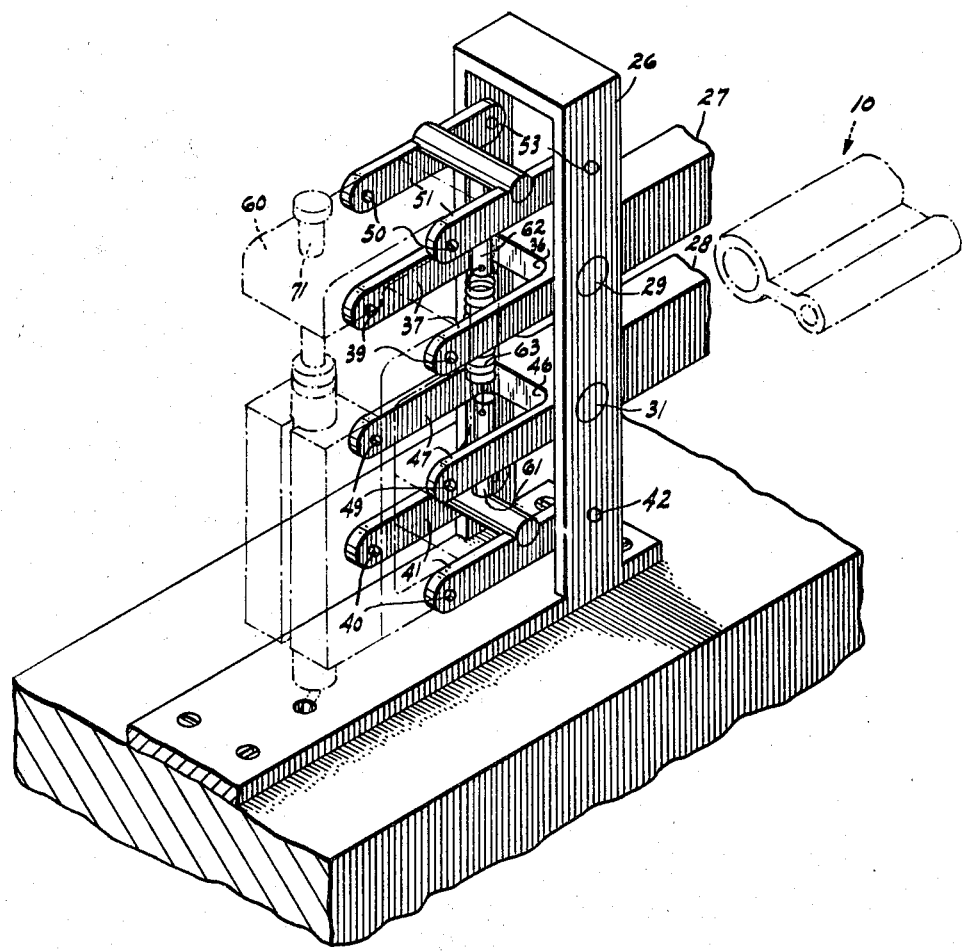

For a better understanding of the invention reference should be made to the following detailed description and drawings wherein:

FIG. 1 is an isometric view of the thickness measurement apparatus,
FIG. 2 represents a view of the tuning probe and transformer supported by the lever systems,
FIG. 3 is a view of a pair of guide pulleys,
FIG. 4 is a plane view of the apparatus,
FIG. 5 is a view representing different relative positions of the plunger and probe,
FIG. 6 is an isometric view of the linkage arrangement, and
FIG. 7 is a schematic circuit diagram of the invention.

As is seen in FIGURE 1, a self-supporting cable 10 comprising a cable core 11, a support wire 12, and an integral extruded plastic jacket 13 having a flat web portion 14, is fed between pairs of rollers 16—16, 17—17. The rollers maintain the web portion 14 of the sheath in a horizontal position as it passes through the apparatus. As best seen in FIGURE 4, rollers 16—16 are mounted on arms pivoted at 18—18 and respectively biased towards the core portion 13 of the cable sheath by means of springs 21—21. This arrangement permits the ready insertion of the self-supporting cable into the apparatus and also provides yield in case enlarged sheath areas are encountered. The latter condition sometimes occurs when an extruding operation is started.

Mounted on the frame 26 are a pair of main levers 27 and 28, respectively, pivoted at 29 and 31. At one end of the main lever 27 is a narrow roller or wheel 32 and similarly at the corresponding end of lever 28 is a narrow roller 32. The wheels 32—32 are free to shift axially on shafts 33. The wheels engage opposite sides of the web portion 14 of the cable. Main lever 27 includes a bifurcated portion 36 having arms 37—37 which support the top portion of a link 38 at the pivots 39—39. The link 38 is further supported at its lower portion at pivots 40—40 carried by levers 41—41 which are mounted on frame 26 on pivots 42—42. In a similar manner, lever 28 includes a bifurcated portion 46 having arms 47—47 which support a link 48 at its lower portion at the pivots 49. The link 48 is further pivoted at 50—50 to levers 51—51 mounted on the frame 26 on pivots 53—53 respectively.

Attached to the levers 41 is a T-shaped member 61 and attached to lever 51 is a similar T-shaped member 62. The T-shaped members are interconnected by means of a spring 63 which biases the rollers 32—32 towards each other into engagement with the web 14. In practice it has been found desirable to augment this bias by adding a counterweight 60 to link 48. Link 48 carries an adjustable pin 71. A plunger 72 is slidably mounted in sleeve 80 supported in a housing 75 and is urged in an upward direction by means of a compressed spring 73. The plunger is slotted at 65 which receives the set screw 96. The lower end of plunger 72 carries an adjustable tuning probe 74 adapted to move up and down through the center of a transformer 76 supported in the housing 75 from the link 38. It will be observed that the pin 71 and the plunger 72 respectively include planar surfaces 77, 78 whereby the pin and plunger may move laterally with respect to each other.

Referring to the schematic circuit drawing shown in FIGURE 7, it will be noted that the transformer 76 and tuning probe 74, in effect, form part of an oscillator 81. A remote programming circuit 82 regulates a power supply 83 for the oscillator 81. The output of a demodulator 84 works into a zero correction network 86 connected to a recorder 87 while the response of the recorder is controlled by a bias and level network 88. The position of the tuning probe 74 with respect to the transformer 76 controls its impedance and determines the amplitude of the signals fed from the demodulator 84 to the recorder 87. The zero correction network 86 performs the function of providing a wider swing to the signals fed from the demodulator 84 to the recorder 86 and hence improves the sensitivity of the recording operation to signal variations. The recorder 87 is a conventional potentiometer type chart recorder. The function of the bias and level network 88 is to enable the indicator 91 to operate to the left side of the recording chart 92 since the dimension of most interest will be an overthickness of the web. Since the electrical circuits are for the most part conventional, a detailed description thereof is not required. The oscillator 81 and demodulator 84 are included in the housing 75 with the transformer 76. Preferably, these components are locked in place in the housing 75 by means of an encapsulating or potting material.

*Operation*

In operation, if the cable 10 should move upwardly or downwardly while the thickness of the web remains constant, both rollers 32 would respond in a similar direction. Assume, for example, that both rollers move downwardly. As a consequence, both links 38 and 48 would move upwardly and there would be no change in the relative positions of the tuning probe 74 and the transformer 76. Therefore, no change in thickness will be recorded by the recorder 87. However, when a change in thickness occurs, rollers 32 will move relative to each other, towards or away, and in a similar manner the tuning probe 74 will move with respect to the transformer 76. As a consequence, a variation in the signals will be detected by the demodulator 84 resulting in a thickness recording change in the recorder 87. Actually, only very slight relative movement occurs between the pin 71 and plunger 72 in normal operation when thickness changes are detected. The apparatus is very sensitive to these slight changes. For example, a thickness variation of less than .0001 inch may be detected.

When the rollers 32 move solely in response to a change in cable position, as shown in FIGURE 5, the planar surface 77 of pin 71 and the planar surface 78 of the plunger 72 will merely slide on each other to take up any pivotal motion of the links 38 and 48. Despite changes in thickness of the web portion 14 of the cable 13 the planar surfaces 77 and 78 will, in the normal range of operation, remain in engagement with each other. The planar surfaces 77 and 78, of course, also slide on each other when thickness changes occur in the web portion 14 of the cable 10. FIGURE 2 shows the plunger in a position it assumes when there is no connecting web between rollers 32. In other words, this is an indication of zero thickness. The amount that the plunger 72 protrudes from sleeve 80, therefore, is a measure of the thickness of the connecting web.

A further advantage of the continuous engagement of the surfaces 77 and 78 is that a dampening effect takes place and there are no sudden forces transmitted by the lever system which might cause movements which would affect the relative position of the tuning probe 74 and the transformer 76 and result in false recordings. Actually, the plunger 72 functions somewhat like a dash pot, since air is entrapped in the region of the spring 73. Since the pin 71 and plunger 72 are not coupled to each other, they may move laterally as described without disturbing the axial position of the tuning probe 74.

If the web height is lessened to a certain degree, for example, when crossover occurs, it is possible that one or both rollers 32 may ride into contact with cylindrical sheath portions surrounding the core 11 or the support wire 12. In such a case, the apparatus should still be considered to be measuring thickness.

Lever 28 is provided with an extension 94 which engages a bumper 95 in case the lever 28 suddenly moves to its open position, for example, if the web portion 14 becomes unusually thick over a particular length of cable. A dash pot could be connected between levers 27 and 28 if additional dampening is required.

Various changes and modifications may be made in the invention without departing from the scope.

What is claimed is:

1. Apparatus for measuring the thickness of a moving strip comprising:
    a pair of pivotally mounted levers,
    a roller carried by each of the levers,
    means for biasing the levers towards each other so that the rollers engage opposite portions of a moving strip,
    a circuit for recording the strip thickness including:
        inductance means and,
    a linkage coupled to each lever,
    one of the linkages supporting:
        the inductance means,
        a tuning probe for the inductance means,
        a slidable member carrying the probe, and
        resilient means for biasing the slidable member towards the other linkage,
    the other linkage supporting:
        a pin engageable by the slidable member whereby the slidable member will vary in position in accordance with variations in the strip thickness and thereby cause the probe to move relative to the inductance means to vary correspondingly the operation of the recording circuit.

2. Apparatus according to claim 1 wherein:
    the respective ends of the slidable member and the pin facing each other have flat surfaces normally in contact with each other.

3. Apparatus according to claim 1 wherein:
    the slidable means is a plunger having a flat end surface, and the pin is adjustable and includes a flat end surface normally engaging the flat surface of the plunger.

4. Apparatus according to claim 1 wherein the strip is a self-supporting cable and the rollers are normally in contact with the connecting web portion comprising:
- a pair of guide rollers mounted at one side of the levers,
- a second pair of guide rollers mounted at the opposite side of the levers,
- spring means for urging at least one of the guide rollers of each pair toward the other guide roller of each pair,
- one guide roller of each pair having a groove contoured to receive the core portion of the cable sheath, and
- the other guide roller of each pair having a groove contoured to receive the support wire portion of the cable sheath.

5. Apparatus according to claim 1 including:
means for mounting the rollers for movement in the axial direction.

6. Apparatus according to claim 1 having:
means for pivotally supporting each linkage means, so that movements of the cable do not disturb the relative positions of the tuning probe and the inductance means.

7. Apparatus for measuring the thickness of a moving strip comprising:
- a frame,
- a pair of levers pivotally mounted one above the other on the frame,
- a shaft mounted at one end of each lever and protruding therefrom,
- a roller slidable mounted on each shaft,
- spring means for biasing the levers toward each other so that the rollers engage opposite portions of a moving strip,
- a circuit for continuously recording the strip thickness including:
    inductance means,
- each lever including a bifurcated portion at the end thereof opposite the end on which the shaft is mounted,
- a second pair of levers mounted in parallel relationship at opposite sides of the frame and below one of the first mentioned levers,
- a third pair of levers mounted in parallel relationship at opposite sides of the frame and above the other of the first mentioned levers,
- the spring means being connected between the second and third pairs of levers,
- a link pivotally mounted to the bifurcated portion of the said one lever and to the third pair of levers,
- a link pivotally mounted to the bifurcated portion of the said other lever and to the second pair of levers,
- one of the links supporting:
    the inductance means,
    a tuning probe for the inductance means,
    a slidable member carrying the probe, and
    spring means for biasing the slidable member towards the other link,
- the other link supporting:
    a pin engageable by the slidable member whereby the slidable member will vary in position in accordance with variations in the strip thickness and thereby cause the probe to move relative to the inductance means to vary correspondingly the operation of the recording circuit.

8. Apparatus according to claim 7 wherein:
the inductance means comprises a transformer which forms part of an oscillator.

9. Apparatus according to claim 7 characterized in that:
the plunger is mounted snugly within an opening above the spring means whereby movements of the links are damped.

10. Apparatus for measuring the thickness of a moving strip comprising:
- a pair of pivotally mounted levers,
- a roller carried by each of the levers,
- means for biasing the levers towards each other so that the rollers engage opposite portions of a moving strip,
- a circuit for recording the strip thickness including:
    impedance means, and
- a linkage coupled to each lever,
- one of the linkages supporting:
    the impedance means,
    a tuning probe for the impedance means,
    a slidable member carrying the probe, and
    resilient means for biasing the slidable member towards the other linkage,
- the other linkage supporting:
    a pin engageable by the slidable member whereby the slidable member will vary in position in accordance with variations in the strip thickness and thereby cause the probe to move relative to the impedance means to vary correspondingly the operation of the recording circuit.

References Cited

UNITED STATES PATENTS

| | | | |
|---|---|---|---|
| 2,007,840 | 7/1935 | Terry | 33—148 |
| 2,122,818 | 7/1938 | Ladrach | 33—148 |
| 2,299,997 | 10/1942 | Ladrach | 33—147 |
| 2,308,033 | 1/1943 | Terry et al. | 33—148 |
| 2,932,089 | 4/1960 | Dexter et al. | 33—147 |

WILLIAM D. MARTIN, JR., *Primary Examiner.*

UNITED STATES PATENT OFFICE
CERTIFICATE OF CORRECTION

Patent No. 3,391,463            July 9, 1968

John G. Ambers et al.

It is certified that error appears in the above identified patent and that said Letters Patent are hereby corrected as shown below:

Column 1, line 17, "rollers" should read -- a roller --; same line 17, "engage" should read -- engages one of the --; lines 20 and 21, "only respond" should read -- accurately responds --; line 21, beginning with "and not to" cancel all to and including "transformer." in line 25, and insert -- members carried by linkages associated with the respective levers are in slidable contact with each other whereby the axial position of the probe with respect to the transformer is not disturbed. --. Column 4, line 7, "other," should read -- other. --.

Signed and sealed this 30th day of December 1969.

(SEAL)

Attest:

Edward M. Fletcher, Jr.

Attesting Officer

WILLIAM E. SCHUYLER, JR.

Commissioner of Patents